INVENTORS
ALBERTO VIARENGO
RAFFAELE PASCULLI
BY
Irving M. Weiner
ATTORNEY

3,755,390
**PROCESS FOR CONTINUOUSLY
SEPARATING GLYCERIDES**
Alberto Viarengo and Raffaele Pasculli, both of
2 Via San Damiano, Milan, Italy
Filed Sept. 3, 1969, Ser. No. 854,925
Int. Cl. C11b 7/00
U.S. Cl. 260—428.5        2 Claims

ABSTRACT OF THE DISCLOSURE

The invention describes a process for continuously separating glycerides by a low temperature fractionation of a glycerides-solvent mixture, by continuously gravity feeding such mixture within a cooling environment. The process comprises providing a highly diluted mixture and localized stirring thereof for promoting heat-exchange in horizontal planes therein, while subjecting it to cooling, and filtering and separating crystallized glycerides from the solvent, and an apparatus including said environment and feeding, cooling, stirring and separating means therefor.

BACKGROUND OF THE INVENTION

This invention is concerned with a process and an apparatus therefor, designed to continuously process glycerides, and more particularly it relates to a process for continuously subjecting glycerides to low temperature fractionation in such a manner that crystals of such shape and dimensions adapted for facilitating their subsequent separation by filtration are provided.

According to common knowledge in the art, searches have been made for providing actually feasible methods for fractionating fatty substances into their components with a view to removing undesired fractions thereof, and improving the commerical value of said substances, by selectively providing fractions or groups of glycerides which individually possess features more desirable and valuable than those of the crude material.

It is further known, that the most accepted method comprises fractionally crystallizing the crude material. Such method consisting of progressively cooling the crude fatty substance (glycerides) to promote the crystallization, at a given temperature, of those components which have a freezing temperature at the given temperature and then separating, by filtration, such crystallized components from the remaining liquid mass.

The above referred to steps are advantageously performed, not by acting on the sole crude fatty substance, but on a mixture obtained by preliminarily mixing the fatty material with a suitable solvent. This preliminary mixing expedites reaching, at low temperature, the equilibrium between solid phase and liquid phase, promotes crystallization while the tendency to uneven crystal formation is minimized, and facilitates also the subsequent filtration.

The importance of the physical properties of the crystals, in view of their selective separation by filtration, is clearly evident. As a matter of fact, if suitable expedients are not used to expedite low temperature crystal formation the provision of desirably similar physical properties of the crystals (namely, shape and dimensions thereof) will not be ensured, as desirable in view of the subsequent filtration and separation. On the contrary, it might occur that micro-crystallites are produced which will tend to clog the woven networks of the filtering means. If suitable expedients are used to promote low temperature crystallization and such desirable even dimensions, safe and proper separation by filtration should therefore be ensured.

It is still further known that proper and well adapted expedients to promote low temperature crystallization have been found and heretofore made use of in industrial applications where the crystallization is promoted in a batch process, because such batch processes can provide, by their own non continuous nature, the largest adjustment amplitude. It is however evident that the above desirable advantages of any batch process are obtained by adversely affecting the low cost of the production.

To provide a proper continuous process, either technically and economically adapted for mass production, for selectively and efficiently growing glyceride crystals of uniform shape and dimensions to ensure the most effective filtration and separation thereof is therefore highly desirable. The current art is however still not aware of such highly desirable process.

Objectionable drawbacks of the current art are possibly caused by the fact that, in known installations designed for industrial continuous processing, apparatus of the horizontal type is used wherein the mixture to be cooled is progressively advanced by means of pumps connected along the fluid feeding piping and circuitry, and the stirring of the mixture is provided by conventional stirrers of various types. In such conventional crystallizers, either by the fact that the advancing of the mixture under cooling is accomplished by such mechanical means, or by the manner in which the stirring is performed, an agitation of uneven and turbulent character is maintained in the liquid mass. Such agitation is unfavorable in that it hampers the desirable progressing of crystal formation and even growing of the crystals.

It is therefore an object of this invention to remove the above and other drawbacks and limitations of prior art. More particularly, it is an object of this invention to provide a novel and advantageous continuous process for ensuring the most desirable crystal formation and selective separation of glycerides. Another object of the invention is to provide a new apparatus for carrying out this novel process.

SUMMARY OF THE INVENTION

According to the invention, the improved process comprises promoting the crystallization while the mixture glycerides-solvent is caused to vertically descend by gravity into a vertically arranged and cooled crystallizer. The crystallizer is fed from above and exhausted from below making use of proper and preferably high dilution ratios of the mixture, and providing a suitable controlled stirring of the cooled mixture.

It has been found that by using a vertically elongated and positioned crystallizer, fed and exhausted as described above, that an essential and critical expedient is provided for more proper and efficient crystallization. As a matter of fact, by making use of a such arranged crystallizer the crystallizing in the mixture, as a whole, develops in a vertical direction under the effect of a hydraulic head, that is by gravity only, and no substantial mixing of liquid fraction at differing levels occurs.

In addition, an advantageous spontaneous decanting effect develops combined with the uniform vertical downward movement of the mass of the mixture in the crystallizer further improving the processing of the mixture caused by progressive cooling. As a matter of fact, the part of the mixture which has attained a lower temperature and which therefore is near or at the crystallization phase is collected at the lower levels of the liquid mass owing to its greatest density relatively to the remaining liquid portion of the mixture. The formed crystals are collected at the lowermost portions of the crystallizer owing to the greatest density thereof relatively to the remaining liquid portion of the mixture.

Such vertical arrangement of the crystallizer, together with the downward movement of the mixture due to gravity alone, dispenses with fluid turbulence and disturbance promoted by using pumping means or other mechanical means to move the mixture through a crystallizer, and also results in an advantageous saving of power required to drive the pumping means.

Further, as a consequence of the vertical arrangement of the crystallizer the solid crystallized phase is spontaneously collected in the lowermost portion of the crystallizer adjacent the outlet thereof. The mixture remaining in the liquid phase (liquid triglycerides) at the outlet will carry the entire solid crystallized phase at the selected treatment temperature (solid crystallized glycerides) in suspension to a filtering means.

The invention is further characterized by the use of high dilution ratios of the glycerides in the solvent. Such high ratios lead to the most advantageous performance of both the crystallization step and of the subsequent filtration step. The above description will be better understood from the following. Assuming for example a typical case wherein the crystallized solid phase consists of triglycerides of stearic acid, it must be noted that such triglycerides have a density of about: $d_{20}$ of 0.900 which is noticeably different from that of the most commonly used solvents (hexane of trade of about: $d_{20}$ of 0.700; acetone of trade of about: $d_{20}$ of 0.790). The higher the amount of solvent in the mixture, the greater will be a tendency of the crystals, owing to the density difference, to collect at the lowermost part of the crystallizer. Subsequently, the liquid phase which will appear at the crystallizer outlet and which will be supplied to filtration, will consist of a mixture for which the crystallization process can be assumed to be completed.

Still further, and as another advantageous consequence of the above discussed high solvent content in the mixture, the liquid carrying the crystals in suspension which is issued from the crystallizer outlet and supplied to the filter means, has a very low viscosity. Such a low viscosity imparts to the liquid a noticeable flowability which improves the efficiency of the filtration and ensures an active "washing effect" by the liquid phase of the crystalline layer which builds up on the filter screening means thus preventing the undesired liquid triglycerides from clogging the interstices between adjacent crystals. The solid phase thus collected on the filtering means will therefore be of the most desirably high purity.

Still further, the invention is noted by a suitable stirring of the mixture subjected to the crystallization step, such stirring contributes for further improvement of the efficiency of the process. More particularly, it has been found that when the stirring is performed so that a substantially turbulent and disorderly agitation is promoted in a substantial part of the liquid mass, as it is in conventionally constructed and operated crystallizers, progressive and uniform crystal growing is impaired and even prevented. According to a further aspect of this invention, it has been found that the crystallization step is further improved by circulating of that part of the mixture which actually contacts the jacketed or otherwise cooled wall of the crystallizer through the mixture toward the center of the crystallizer by imparting a localized motion to this mixture by means of suitably dimensioned, shaped and driven stirring means.

These and other features and advantages of the invention will be apparent to those skilled in the art from the following detailed description of a preferred embodiment, but not limitative example, an operation of an apparatus arranged and constructed further in accordance with this invention. Such description refers to the accompanying drawings, forming an essential component of this disclosure, and wherein any structural details and parts which individually appertain to current knowledge of the art have been omitted for simplicity.

Figure 1A:
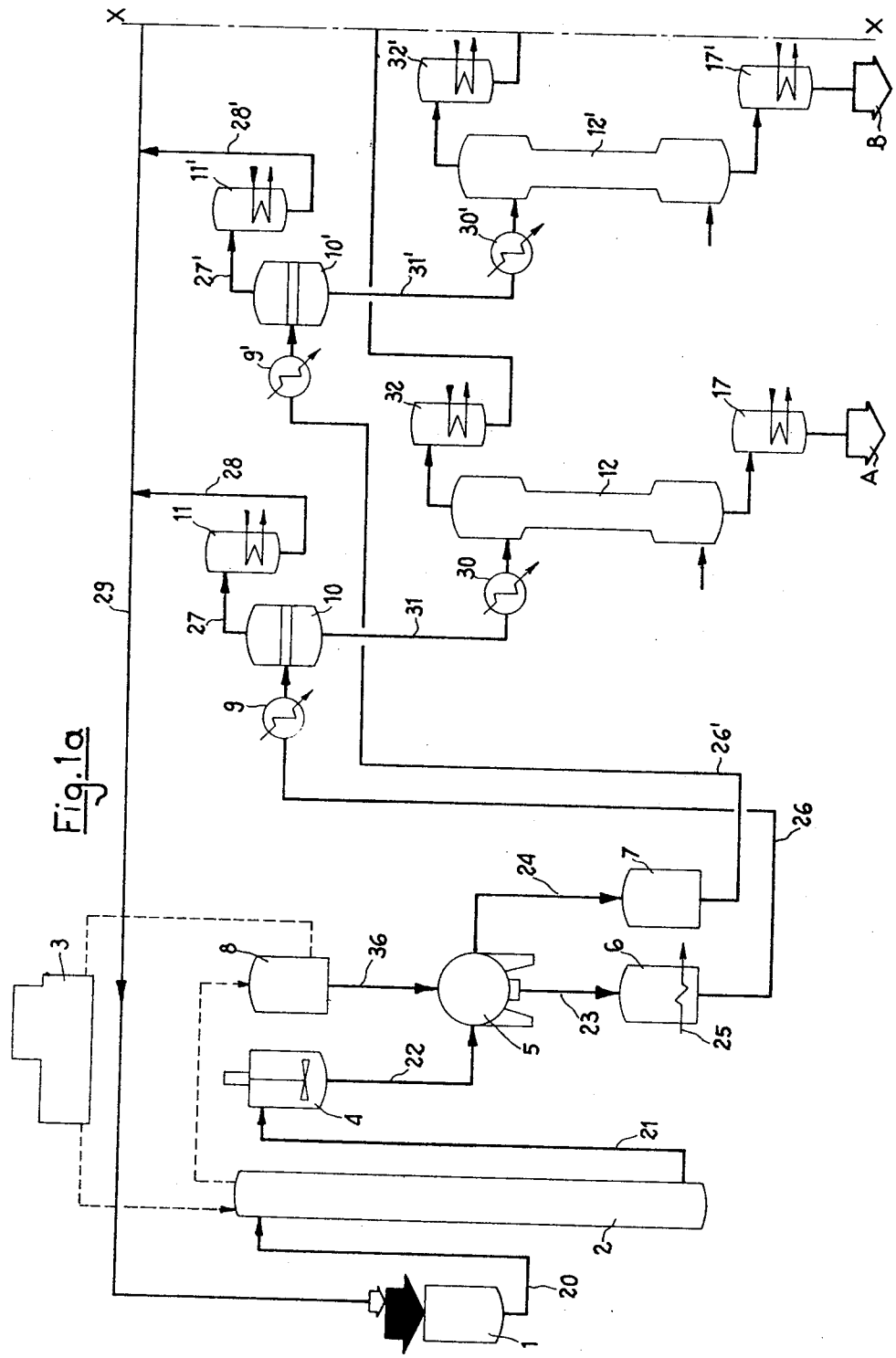
FIGS. 1a and 1b, joined together along the line x—x, diagrammatically show a continuous apparatus for separating glycerides according to the present invention.
Figure 1B:
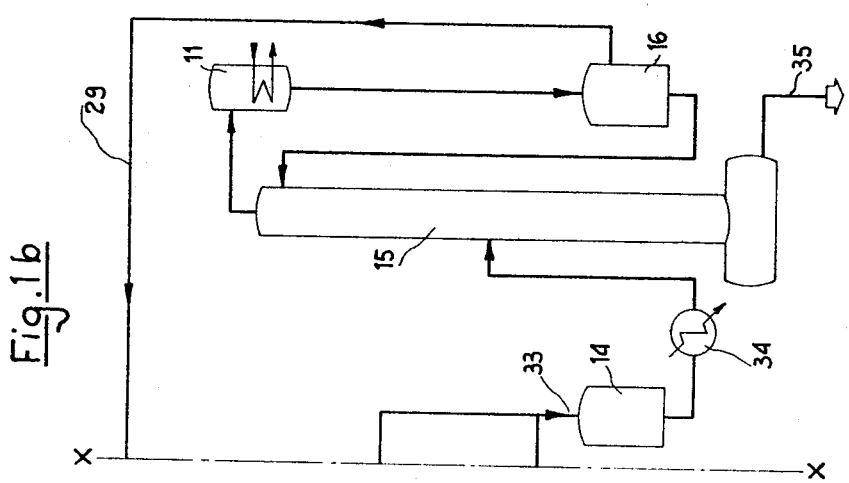

Referring to the drawings and firstly to FIGS. 1a and 1b, the apparatus for continuously separating glycerides is fed with the oil or fatty crude material and with the solvent, e.g. acetone. The crude material and the solvent are proportioned by variable delivery pumps (not shown) according to a suitable ratio, which can be up to 1:10, and then mixed together in a mixer 1. The mixture is fed, through a duct 20, to the top of a crystallizer 2, which shape and mode of operating will be discussed hereinafter with reference to FIG. 2. Within the crystallizer 2, the mixture is cooled and consequently its high-melting fractions become crystallized, said mixture being thereafter fed, from the crystallizer bottom and through a duct 21, into a tank 4, which comprises means for slowly stirring said mixture. From the tank, the mixture is then fed, through a duct 22, to a filtering means, wherein the crystallized fraction is separated from the remaining solution which comprises the low-melting fraction.

The filtering means is preferably formed by one or more vacuum filters having a plurality of rotating filtering plates wherein the complete operating cycle comprising the steps of washing the plates and cleaning the filtering network is performed by maintaining the filter in a closed condition without any need of removing the filtering plates and manually acting thereon. As it will be better seen subsequently, the washing and cleaning operations of the filtering means are carried out with a fluid consisting of the solvent of the process, e.g. acetone, suitably cooled and preferably directly drawn from the cooling circuitry.

At the outlet of the filtering means, the filtration products, namely the solid product containing said high-melting fraction and the filtrate, are separately collected, through ducts 23 and 24, respectively, in collecting tanks 6 and 7, respectively. The first collecting tank 6 comprises a heating coil in order to fluidize the body of the solid product and dissolve the crystals.

At the outlets of the tanks 6 and 7, the separated fractions are fed, through ducts 26 and 26', respectively to means for performing the steps of removing the present acetone, which steps are carried out separately and in parallel for each fraction. In more detail, for simplicity examining only the path of the high-melting fractions, from duct 26 the mixture passes through a plant wherein a first separating operation is carried out and then improved in a following stripping column, generally indicated by reference numerals 12 and 12' for the high-melting and low-melting fractions respectively. The plant wherein a first acetone separating step is carried out and allows the use of a stripping column of reduced size comprises a pre-heater 9, adapted to heat the mixture at a suitable temperature and feed the same to an expansion chamber 10 wherein, due to the pressure reduction, most of acetone evaporates. The evaporated acetone is collected through a duct 27 in a condenser 11 wherefrom it is brought back in the path by means of a duct 28 and a collecting duct 29. The required sub-atmospheric pressure to be maintained within the expansion chamber 10 is directly provided by establishing a connection between the expansion chamber and the downstream condenser 11 wherein the pressure drop is provided by the condensation of gaseous acetone.

From the bottom of the expansion chambers 10 and 10' the mixtures, which still comprise a low percentage of acetone, are then supplied via a duct 31 and respectively 31', to preheaters 30 and 30' respectively and hence to the respective stripping columns 12 and 12'. Such columns are preferably of the type designed to operate on the material in form of thin layer contacting heated wall surfaces so that a brief dwell time is required in the distillation environment. Advantageously, the heating is provided by indirectly applied steam within jacketed side and bottom walls of the columns, and also by directly admitting steam to the bottom of the columns for decreasing the partial pressure and therefore reducing the boiling temperature.

As a consequence thereof, at the bottom of said columns 12 and 12' there are obtained, respectively, the high-melting fraction A and the low-melting fraction B of glycerides, said fractions being then cooled within cooling means 17 and 17' respectively, while the acetone, which has been humidified by the stripping treatment is recovered from the tops of said columns 12 and 12', respectively, condensed within condensers 32 and 32', respectively fed into a collector duct 33 and then fed to a collecting tank 14 (FIG. 1b). From said tank 14 the moist acetone is then supplied to a rectifying column 15 wherein it is separated from water which is exhausted at 35, and then fed to a tank 16 wherefrom it is recycled to the collecting and return duct 29. Before its distillation in rectifier 15 the acetone-water mixture is heated in a preheater 34.

According to an advantageous feature of the invention the cooling of the crystallizer 2 is provided by circulating a fluid coolant consisting of same solvent made use in the glycerides separation process through a cooling unit 3 and the circuit indicated by dotted lines in FIG. 1a. By making use of such an expedient, any risk of contamination, such as caused by leakage between the coolant and process circuits is completely prevented, and it is also possible to perform the washing and the cleansing of the filtering units by directly using a fluid recovered from the coolant circuitry, namely from a tank 8 via a duct 36, thus ensuring that the operation will be performed at the required temperature and without any need of additional steps such as required if the operations would be made by making use of a different washing fluid.

As hereinbefore briefly indicated, the crystallizer 2 is of a particular and advantageous construction and arrangement, such as to ensure the most desirable efficiency in the crystal formation, and more specifically so to prevent any uneven and intense agitation of the mixture which could impair said crystal formation, said objectionable agitation being promoted by the use of feeding pumps in conventionally constructed and operated apparatuses.

Figure 2:
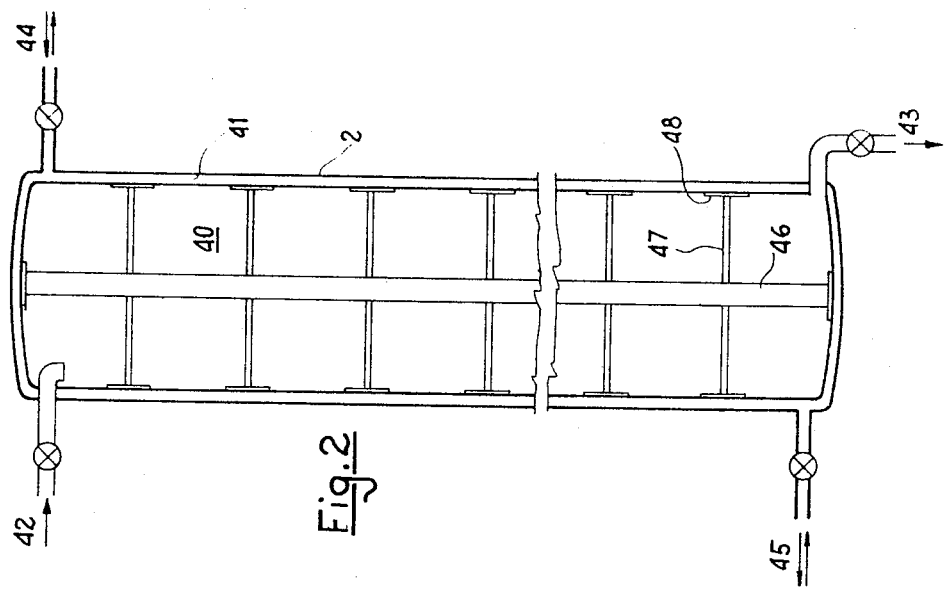
FIG. 2 shows a longitudinal section of the crystallizer in the apparatus of FIGS. 1a and 1b.

According to the invention and as exemplified in FIG. 2, said crystallizer, generally indicated at 2, consists of a tower-like structure confining a crystallization environment forming chamber 40 wherein the described mixture is fed from above and downwardly progresses by gravity only while being cooled by heat-exchange with the coolant fluid which is caused to circulate within the jacketed walls 41 of the structure. More particularly, the mixture to be processed is supplied at the top of the chamber 40 via inlet duct means 42 and it is progressively cooled while it uniformly and essentially undisturbed progresses downward to the bottom of said tower where it is exhausted at 43 and supplied, still by gravity, to the tank 4 and to the filtering assembly 5 (FIG. 1a).

When in the chamber 40 the mixture is not subjected to any substantial agitation or perturbation, in particular to noticeable heat-exchange in the vertical direction because its cooler and hence denser portions spontaneously tend to displace themselves towards the bottom of the chamber wherefrom said portions are then exhausted. Eventually, it is possible and advantageously convenient to provide suitable means designed to promote a slow and regular motion within the mixture for facilitating heat-exchange within the liquid mass, but confined within well defined horizontal layers thereof whereby an even temperature can be maintained at any level between the center portion and the portion adjacent to the cooled side wall of the chamber 40. Said means comprise for example a shaft 46 supported and driven by means (not shown) in the vertical axis of said chamber, said shaft 46 having vertically spaced beams 47 secured thereto and carrying correspondingly vertically spaced and evenly arranged blades 48 designed to provide the desired slow motoin and heat-exchange within well defined horizontal layers of said liquid mass. The feeding and drawing of the cooling fluid to and from the external chamber 41 may be carried out respectively through the ducts 44 and 45, or vice versa, thus obtaining a countercurrent or an equicurrent circulation. It is obvious that while an apparatus comprising only one crystallizer has been described apparatuses wherein two or more crystallization steps, e.g. subsequent crystallization steps, may be provided.

What is claimed is:

1. A process for producing filterable glyceride crystals by continuously separating glycerides by fractional crystallization at low temperature from a solution of selected glycerides in a mixture with liquid solvent, comprising the steps of:

obtaining a mixture of glycerides-solvent wherein the glycerides have a density greater than that of the solvent;

supplying said mixture to the top of an uncompartmented elongated crystallizer environment;

cooling said elongated crystallizer environment with a coolant which is the same as the solvent used to prepare the mixture to a temperature corresponding to that of crystallization of said glycerides in said mixture;

allowing said mixture to descend by gravity through said vertically elongated crystallizer environment;

imparting a circular motion to said mixture to maintain a constant temperature in horizontal layers of said mixture in said crystallizer environment;

extracting said mixture containing crystallized glycerides from a bottom of said crystallizer environment;

supplying said mixture containing crystallized glycerides to a filtering means;

filtering said crystallized glycerides from said mixture;

supplying said crystallized glycerides to a first collecting tank;

supplying said filtered mixture to a second collecting tank;

heating said crystallized glycerides in said first tank to dissolve said crystals;

subjecting said dissolved crystals in said first collecting tank and said filtered mixture in said second collecting tank to a solvent elimination process;

recovering said solvent which is a product of said solvent elimination process;

recycling said solvent recovered by said solvent elimination process; and cooling said dissolved crystallized glycerides separated from said solvent during said solvent elimination process; and recovering said cooled crystallized glycerides.

2. A process to provide filterable crystalline glyceride by continuously separating glycerides by fractional crystallization at low temperature of selected glycerides in a liquid solvent, comprising the steps of:

blending a mixture having on the order of one part glycerides to ten parts solvent;

feeding said mixture to the top of an uncompartmented crystallizer environment;

cooling said crystallizer environment to a temperature corresponding to the temperature of crystallization of said glycerides to be crystallized with a coolant which is the same as the solvent used to prepare the mixture;

allowing said mixture to descend by gravity through said crystallizer environment, glyceride crystals forming in said mixture as it descends;

imparting circular motions to said mixture in said crystallizer environment in a plurality of horizontal layers to maintain a constant temperature in the horizontal layers of said mixture;
extracting said mixture containing said glyceride crystals from a bottom of said crystallizer environment;
filtering said crystallized glyceride crystals from said mixture;
supplying said filtered crystallized glycerides to a first collecting tank;
supplying said filtered mixture to a second collecting tank;
heating said crystallized glycerides in said first tank to dissolve said crystals;
eliminating said solvent from said melted glyceride crystals in said first tank;
eliminating said solvent from said filtered mixture in said second tank;
recovering said solvent eliminated;
recycling said recovered solvent; cooling said melted glyercide crystals; and
recovering said cooled glycerides.

References Cited
UNITED STATES PATENTS

| | | | |
|---|---|---|---|
| 2,883,405 | 4/1959 | Cavanagh | 260—428.5 |
| 2,514,608 | 7/1950 | Muckerheide | 260—428.5 |
| 2,910,363 | 10/1959 | Rubin et al. | 99—118 |

LEWIS GOTTS, Primary Examiner

D. G. RIVERS, Assistant Examiner

U.S. Cl. X.R.

62—123; 260—410.7